Patented Oct. 9, 1923.

1,469,816

UNITED STATES PATENT OFFICE.

IRVING C. MATTHEWS, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing.     Application filed December 26, 1922. Serial No. 609,129.

*To all whom it may concern:*

Be it known that I, IRVING C. MATTHEWS, a citizen of the United States of America, residing at Rochester, in the county of Monroe and State of New York, have invented certain new and useful Improvements in Cellulose-Ether Compositions, of which the following is a full, clear, and exact specification.

This invention relates to cellulose ether compositions. One object of my invention is to provide a cellulose ether solution which may be manufactured into strong, flexible, transparent film on the machines and by the methods now in use. Other objects will hereinafter appear.

In U. S. Patent No. 1,188,376, Lilienfeld, June 20, 1916, there are disclosed a series of alkyl ethers of cellulose. Certain of these are practically insoluble in water, and my invention relates, because of their technical importance, to ethers having that property, although it is not limited thereto. While the ethers form thin solutions in the members of the benzene series of hydrocarbons, such as benzol, toluol and xylol, it has been found that such single solvents by themselves do not dissolve a sufficient proportion of the ethers to make a desirably thick, flowable composition or dope, such as is preferred in the manufacture of photographic film base by customary methods or in analogous plastic arts.

I have discovered that an adequately strong and useful solvent for the ethers may be prepared by mixing any of the above hydrocarbons, or a mixture of two or more of them, with beta-chloro ethyl acetate. This substance may be mixed with the above mentioned hydrocarbons in widely varying proportions and still produce useful results. For instance, I may mix 10 parts by weight of beta-chloro ethyl acetate with 80 parts of benzol, or 75 parts of beta-chloro ethyl acetate by weight to 25 parts of benzol. The preferable formula for film manufacture is approximately equal parts by weight of benzol and beta-chloro ethyl acetate. For the manufacture of film I prefer to dissolve 1 part of cellulose ether, say water-insoluble ethyl cellulose, with from 4 to 6 parts by weight of the mixed solvent mentioned above. I have been unable to produce proper solutions of this strength by using the hydrocarbons alone or the beta-chloro ethyl acetate alone. The mixture of them brings out latent solvent powers. For varnish manufacture the solutions may be diluted.

Instead of the benzol, toluol and xylol, I may use the alkylated or halogenated derivatives of these, which are well known to those skilled in the art. To the ether solutions produced by the aid of beta-chloro ethyl acetate I may also add volatile substances, such as methyl or ethyl alcohol, acetone, chloroform and turpentine, the latter, of course, being used for varnish manufacture rather than in the preparation of photographic film base. Other substances of higher boiling point, such as amyl acetate, triphenyl or tricresyl phosphate, camphor, etc., may be added to impart additional suppleness or incombustibility or other qualities to the film.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A composition of matter comprising cellulose ether dissolved in a liquid containing beta-chloro ethylacetate.

2. A composition of matter comprising an alkyl ether of cellulose dissolved in a mixture of beta-chloro ethyl acetate and an aromatic hydrocarbon of the benzene type based upon a molecule containing less than 9 carbon atoms.

3. A flowable composition comprising an alkyl ether of cellulose dissolved in a mixture of beta-chloro ethyl acetate and benzol.

4. A viscous flowable composition comprising water-insoluble ethyl cellulose dissolved in a mixture of from 10 to 75 parts of beta-chloro ethyl acetate with from 80 to 25 parts of benzol.

5. A composition of matter comprising water-insoluble ethyl cellulose dissolved in a mixture containing approximately equal parts by weight of beta-chloro ethyl acetate and benzol.

Signed at Rochester, New York, this 16th day of Dec. 1922.

IRVING C. MATTHEWS.